United States Patent [19]

Yamazaki et al.

[11] Patent Number: 4,749,916
[45] Date of Patent: Jun. 7, 1988

[54] ILLUMINATOR FOR CULTIVATING PLANT

[75] Inventors: Hiroyoshi Yamazaki, Kamakura; Yoshinori Anzai, Zushi; Makoto Yamanoshita, Kamakura, all of Japan

[73] Assignee: Mitsubishi Denki Kabushiki Kaisha, Japan

[21] Appl. No.: 746,077

[22] Filed: Jun. 18, 1985

[30] Foreign Application Priority Data

Dec. 19, 1984 [JP]  Japan ................................. 59-267667
Feb. 18, 1985 [JP]  Japan ................................. 60-29741

[51] Int. Cl.$^4$ ...................... H05B 41/16; H05B 41/24
[52] U.S. Cl. ................................. 315/254; 47/DIG. 6;
    315/DIG. 5; 315/DIG. 7; 315/312; 315/313;
    315/308
[58] Field of Search ................. 315/DIG. 4, DIG. 5,
    315/DIG. 7, 307, 308, 312, 313, 314, 97, 360,
    362, 254; 47/DIG. 6

[56] References Cited

U.S. PATENT DOCUMENTS

| 3,233,146 | 2/1966 | Uacha | 315/254 X |
| 3,876,907 | 4/1975 | Widmayer | 315/DIG. 5 |
| 3,911,318 | 10/1975 | Spero et al. | 315/39 |
| 3,971,967 | 7/1976 | Hawkins | 315/97 |
| 4,163,341 | 8/1979 | Fogg et al. | 47/58 |
| 4,371,812 | 2/1983 | Widmayer | 315/DIG. 4 |
| 4,396,872 | 8/1983 | Nutter | 315/DIG. 4 |
| 4,544,862 | 10/1985 | Yamazaki et al. | 315/DIG. 7 |
| 4,583,026 | 4/1986 | Kajiwara et al. | 315/DIG. 7 |

FOREIGN PATENT DOCUMENTS

47-21979 10/1972 Japan .
50-79975  6/1975 Japan .
52-116155 9/1977 Japan .
55-29991  3/1980 Japan .

Primary Examiner—Saxfield Chatmon
Attorney, Agent, or Firm—Leydig, Voit & Mayer

[57] ABSTRACT

An illuminator for cultivating a plant by a discharge lamp excited by the output of a high frequency power source by utilizing photosynthetic mechanism. The output power of the high frequency power source is controlled to high and low powers by a bright and dark controller to alternatively supply the high and low powers to the discharge lamp in predetermined periods.

15 Claims, 8 Drawing Sheets

ILLUMINATOR FOR CULTIVATING PLANT

BACKGROUND OF THE INVENTION

The present invention relates to an artificial illuminator for supplying light necessary to cultivate a plant, and, more specifically, to an illuminator which employs a discharge lamp as a light source, thereby enhancing the efficiency of the illuminator.

A method has been proposed which entails supplying the light necessary to breed a plant by irradiating artificial illumination or solar light and supplementing it in a controlled cultivating facility, mainly for agricultural purposes.

An apparatus has been disclosed in Japanese Unexamined Patent Publication No. 55-29991 for suitably illuminating plants by bright and dark rhythms corresponding to day and night which is based on the breeding mechanism of plants. This apparatus is adapted to pass a breeding plant through a position of high illumination directly under ceiling lamps and through a position of low illumination at the intermediate of the lamps in periods substantially corresponding to day and night.

The apparatus is based on the principle that a photosynthesis is accelerated in high illumination corresponding to daytime and a commutation of a photosynthesis product is performed at a low illumination time, as described above.

In the conventional apparatus, costs represent a large portion of plant breeding expense.

The photosynthesis of a plant is generally carried out by a photochemical reaction and a thermochemical reaction. The photochemical reaction necessitates light, but the thermochemical reaction does not require light. Photochemical reaction has a response time of several tens of microseconds and thermochemical reaction has a response time of several tens of milliseconds longer than the photochemical reaction. These reactions are entirely different from the bright and dark rhythm corresponding to day and night.

Further, an apparatus for exciting discharge lamps in high frequency with a "periodic extinquishing" term has been disclosed in Japanese Unexamined Patent Publication No. 47-21979. However, this apparatus merely dims discharge lamps.

SUMMARY OF THE INVENTION

The present invention provides an illuminator for cultivating plants in an energy-saving manner by irradiating light to the plants utilizing principles determined from the analysis of photosynthesis.

BRIEF DESCRIPTION OF THE DRAWINGS

In the drawings, the same symbols indicate the same parts.

DESCRIPTION OF THE PREFERRED EMBODIMENTS

Figure 1:
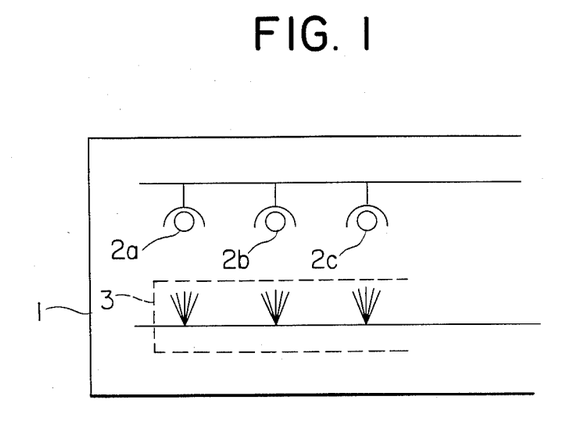
FIG. 1 is an explanatory view of a plant breeding facility.

FIG. 1 illustrates the concept of utilizing an illuminator in a plant breeding facility. In FIG. 1, numeral 1 denotes a plant breeding facility, numerals $2a$, $2b$, $2c$ denote illumination units, each having a discharge lamp, and numeral 3 denotes plants to be cultivated.

Figure 2:
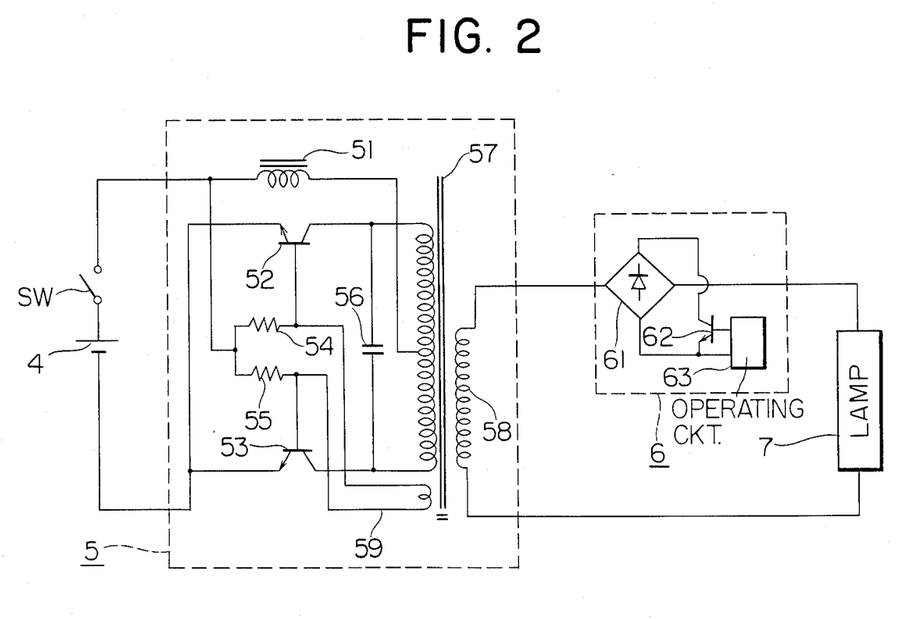
FIG. 2 is a circuit diagram showing an embodiment of the present invention.

FIG. 2 shows an embodiment of an illuminator according to the present invention. In FIG. 2, numeral 4 denotes a d.c. power source, character SW denotes a switch, and numeral 5 denotes a high frequency power source for exciting a discharge lamp 7 at high frequency. A push-pull type transistor inverter includes a coil 51, transistors 52, 53, base resistors 54, 55 of the transistors 52, 53, a capacitor 56, and an output transformer 57 with a secondary winding 58 and a feedback winding 59. Numeral 6 denotes a bright and dark controller which includes a full-wave rectifier 61, a transistor 62, and an operating circuit 63. When the transistor 62 is turned ON, the discharge lamp 7 becomes excited, i.e., is in a "bright" state.

Figures 3A, 3B:
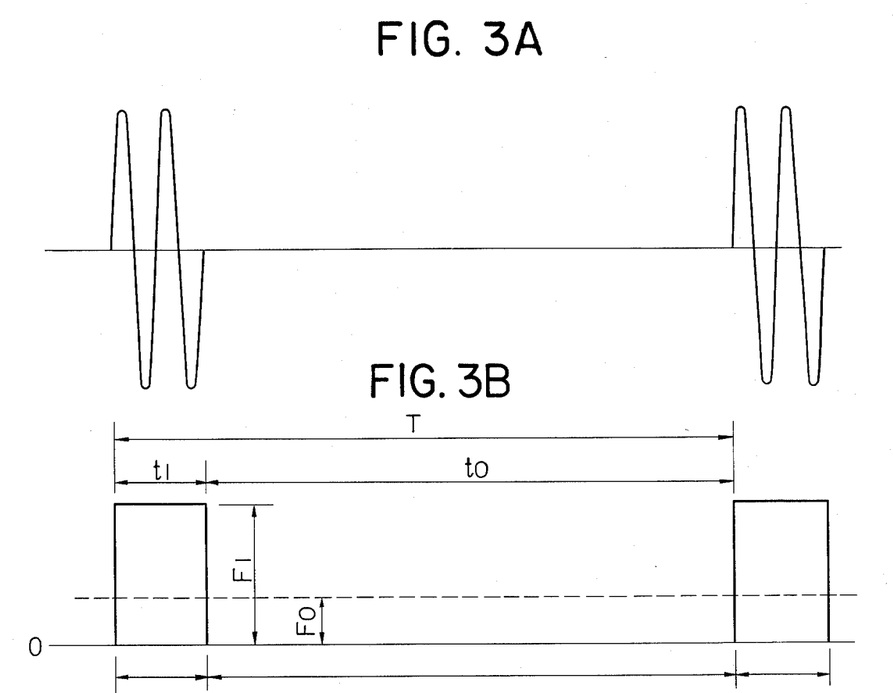
FIG. 3 is an explanatory view of the operation of the embodiment of FIG. 2.

FIG. 3 is a view of the operation of the embodiment shown in FIG. 2. FIG. 3(A) illustrates the current of the lamp 7, and FIG. 3(B) illustrates the output light of the lamp 7 in graphical representation.

In the illuminator of FIG. 2, when the power source 4 is excited by the switch SW, the power source 5 self-oscillates by the operation of the feedback winding 59 of the transformer 57, thereby generating a high frequency output voltage. If the transistor 62 of the controller 6 is ON, a current flows through the lamp 7, and an output light is generated, as shown in FIG. 3(B). When the transistor 62 is OFF, a current flowing through the discharge lamp 7 becomes zero, and the output light of the "dark" portion of FIG. 3(B) becomes zero. In this case, the ratio of $t_1$, the "bright" state period, to $t_0$, the "dark" state period, can be set to approximately 1:100 to 1:1000 by photosynthetic reaction. Assume that the ratio of $t_1$ to $t_0$ is equal to 1:9 ($t_1:t_0=1.9$) and the rated power of the lamp 7 is 100 W for the convenience of description. Then, even if the power consumption of the lamp 7 is ten times the rated power (1000 W) in the "bright" interval $t_1$, the average power consumption of the lamp 7 is still 100 W due to the fact that these is no power consumption in the "dark" interval. As a result, the average power consumption does not exceed the rated power of lamp 7. Thus, the light output of the lamp 7 during the "bright" interval $t_1$ can be as high as 10 times the output light $F_0$ when the lamp is continuously excited by the rated power without the "dark" interval, and the lam 7 is not considerably overloaded. This can be performed since the period T of "bright" and "dark" intervals is relatively short as compared to long periods corresponding to day and night.

Another embodiment of the present invention will now be described with reference to FIG. 4.

In the embodiment described above, no current flows through the discharge lamp in "dark" periods. However, a small amount of current may flow through the discharge lamp to maintain the discharging action. Particularly, when an HID lamp is employed as the discharge lamp, the current may suitably flow through it. An embodiment of this concept includes the auxiliary impedance 8 connected in parallel with the bright and dark controller 6 in the illuminator shown in FIG. 4.

Figure 5:
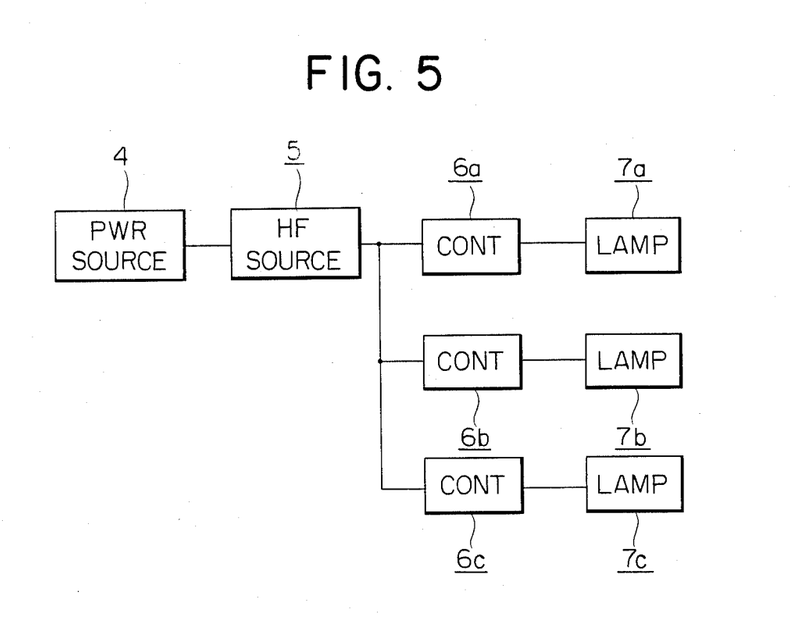
FIG. 5 is an explanatory view showing yet another embodiment of the present invention.

In keeping with another aspect of the invention, another embodiment is shown in FIG. 5. In this illuminator, a high frequency power source supplies electric power to a plurality of discharge lamps. Numerals 6a, 6b, 6c denote bright and dark controllers, and numerals 7a, 7b, 7c denote discharge lamps. In this illuminator, the "bright" period $t_1$ is much shorter than the "dark" period $t_0$. Therefore, when the bright and dark controller is selectively operated so as not to simultaneously supply electric power to the corresponding discharge lamps, the capacity of the high frequency power source 5 may not be substantially increased.

If the "bright" period $t_1$ is not set to a period of one cycle or longer than the output current of the high frequency power source 5, the discharge lamp cannot stably discharge. In other words, in order to use the discharge lamp as a high frequency exciting lamp, the frequency of the discharge lamp should be at least 2 to 3 kHz or higher. As a result, the shortest period of the time interval $t_1$ is determined, and the range of $t_1$ is equal to or greater than 100 microseconds. The "dark" period $t_0$ required for thermochemical reaction is found to be several tens of milliseconds in the prior study. However, if the period $t_0$ is increased, for example, to several tens of seconds, the discharge lamp becomes equivalent to repetition of flashing operation, possibly causing shortened lifetime of the discharge lamp. Therefore, although the intervals $t_0$ are different with low and high frequency discharge lamps, $t_0$ is suitably set at several hundred milliseconds or shorter for completely interrupting the current supplied to the discharge lamp. Because of an unpleasant flickering effect, the repetition period T is from 5 to 20 cycles per second, where $f=1/T$. More specifically, if f is less than 50 cycles per second, the light is hardly sensed visually by the operator, and it is preferable to set the period to approximately $T < 20$ msec.

The power of the discharge lamp during the exciting time affects how $F_1$ in FIG. 3(B) can be obtained as compared to $F_0$. It is preferable to set the illumination during discharging of the lamp to a high value and the ratio $F_1/F_0 > 2$ or higher from the viewpoint of saving the number of illuminators to be installed. For example, at least twice the power of the rated value may be preferably supplied to the discharge lamp during discharging.

Figure 6:
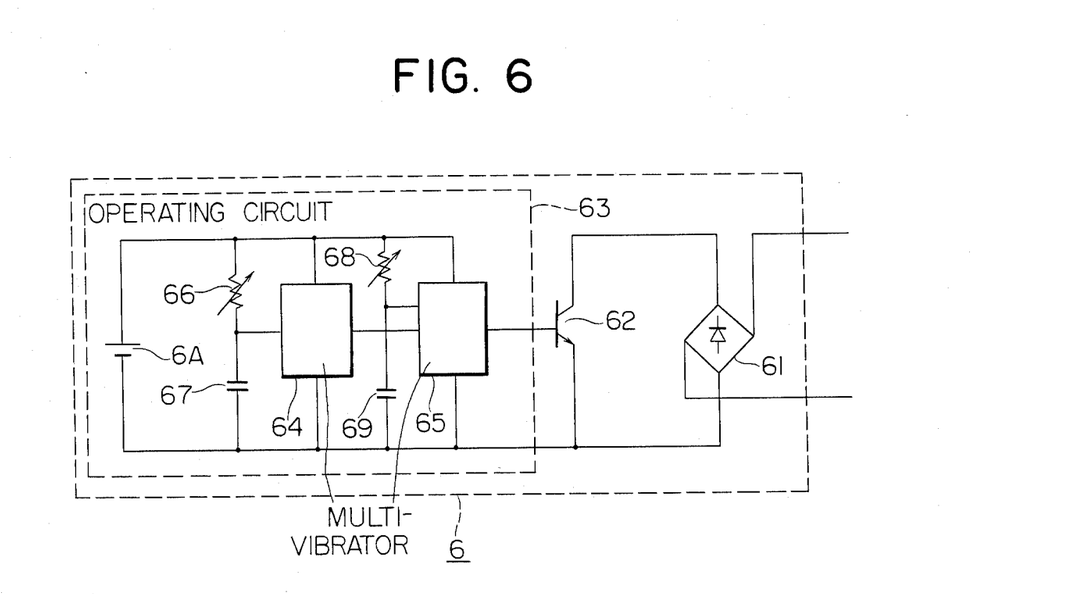
FIG. 6 is a circuit diagram of the bright and dark controller in FIG. 2.

In the illuminator shown in FIG. 2, the operating circuit 63 of the controller 6 has a free-running multivibrator 65 for determining the period T and a monostable multivibrator 64 for determining the "bright" period $t_1$, as shown in FIG. 6. In FIG. 6, numerals 66 and 68 denote setting variable resistors, numerals 67 and 69 denote capacitors, and numeral 6A denotes a d.c. power source for the multivibrators 64 and 65.

With this arrangement, the bright and dark controller 6 can set the ratio of the bright period to the dark period and the period T to desired values.

Figure 7:
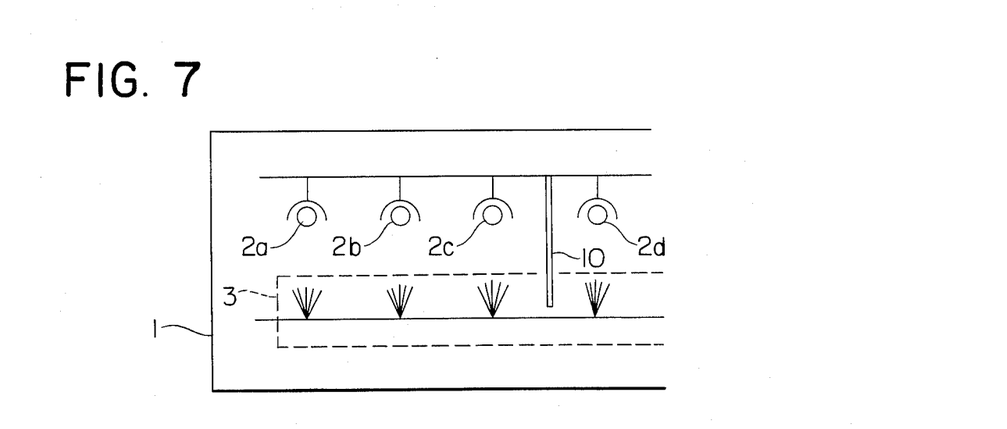
FIG. 7 is an explanatory view of a plant breeding facility modified from that shown in FIG. 1.

More particularly, in FIG. 7, when the lamps of illumination units 2a and 2c are arranged to be excited in a series connection, plants at the position isolated by a light shielding plate 10 can be irradiated by the discharge lamps of the "bright" period $t_1$ and different periods T in response to the growing stage of the plants isolated by the plate 10. When the plants are not moved, the "bright" period $t_1$ may be changed by measuring the growing state of the plants.

In the embodiments described above, the plants are generally irradiated by the illumination units arranged from above. However, the plants may be irradiated by the artificial light arranged from the sides or from below. As a result, the "bright" period $t_1$ may be varied between the light irradiated from above and below. This is because of the construction of the leaves of plants, particularly because photosynthesis in the vicinity of the front surfaces of the leaves is different from that of the back surfaces.

Therefore, an optimum growing environment may be provided, for example, by exciting the discharge lamps for irradiating plants from above and below synchronously and varying the length of the "bright" period $t_1$ or further varying the output of the discharge lamps.

In the embodiment shown in FIG. 5, only one high frequency power source is employed. However, when a number of high frequency power sources are installed, a common d.c. power source 4 is employed to synchronize the opening and closing periods of a plurality of bright and dark controllers, thereby eliminating the superposition of the "bright" periods $t_1$ for the respective high frequency power sources or reducing the number of the illuminators to be superposed in operation to ⅓ or less so as to preferably equalize the load of the d.c. power source 4. In this case, the period $t_1$ may be altered by varying the lengths of the periods for the respective bright and dark controllers.

In the embodiments described above, only the "bright" periods $t_1$ or the periods T of the bright and dark controllers are varied. However, another embodiment of the invention will be discussed when the output of the discharge lamp in the "bright" period $t_1$ is varied. For example, in FIG. 5, suitable impedances are inserted between the discharge lamps 7a, 7b, 7c and the bright and dark controllers 6a, 6b, 6c. Then, the discharge lamps 7a, 7b, 7c may be excited by the different outputs.

When a plurality of high frequency power sources are installed, the impedances may be connected in series with the discharge lamps to differentiate the output currents of the high frequency power sources.

Even if the output frequencies of the high frequency power sources are varied, the outputs of the discharge lamps may be altered. This is the case when a reactance component is used as the current limiting impedance of the discharge lamp.

In addition, the discharge lamps 7a, 7b, 7c have different light emitting spectra and may be excited by the optimum outputs and periods.

Figure 8:
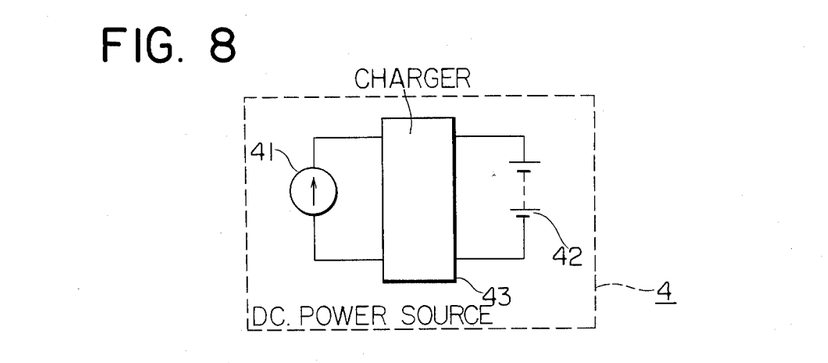
FIG. 8 is a circuit diagram of a solar battery employed as a d.c. power source shown in FIG. 2.

The d.c. power source 4 of FIG. 2 has, as shown in FIG. 8, a solar battery 41, a battery 42 charged by the output of the solar battery 41, and a charger 43. The d.c. power source 4 may employ a d.c. voltage rectified from a general a.c. power source. In this case, when the charging amount from the solar battery is less, the voltage from the a.c. power source is rectified to the d.c. voltage to operate the illuminator. Further, the illuminator may be operated in such a manner to be illuminated by the a.c. power source in the daytime and by the battery charged in the daytime only at night. In this case, the output of the d.c. power source 4 is supplied by employing a switching unit such as an automatic flasher using a light sensor.

Figure 9:
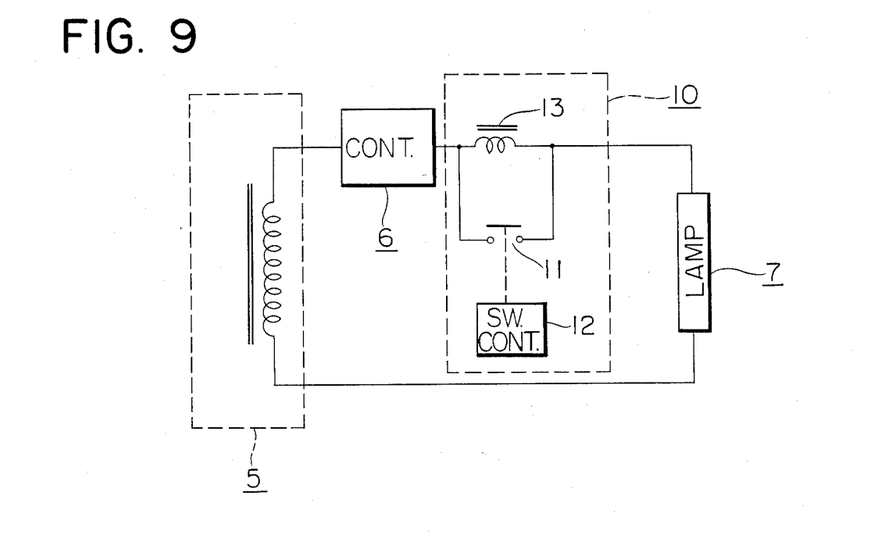
FIG. 9 is a circuit diagram showing still another embodiment of FIG. 8.

FIG. 9 shows still another embodiment of the invention. In FIG. 9, numeral 10 designates a dimmer, which has a dimming impedance 13, a switch 11, and a switching controller 12.

In the illuminator described above, the controller 12 is, for example, constructed to switch the switch 11 by the presence or absence of the solar light as an automatic flasher, and, when the switch 11 is opened, the light may be dimmed due to voltage drop across the dimming impedance 13. Similarly, the "bright" and "dark" periods are provided only when the power is supplied from the battery 42 or the solar battery 41 to excite the illuminator.

Figure 10:
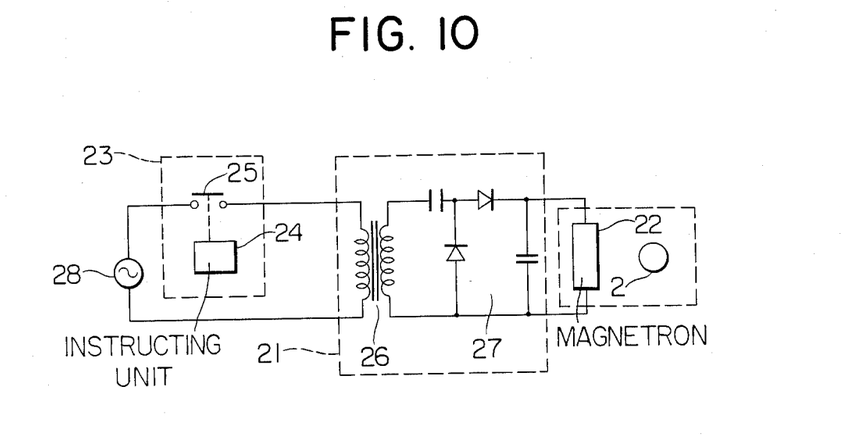
FIG. 10 is a circuit diagram showing an embodiment of the present invention employing an electrodeless discharge lamp.

FIG. 10 shows an embodiment which employs a microwave generator as a high frequency power source using an electrodeless discharge lamp. In FIG. 10, numeral 21 denotes a power source connected to an a.c. power source 28, numeral 22 denotes microwave generating means such as a magnetron having means for transmitting microwaves to a load, light distribution control means for externally producing the light generated from the lamp 2 of a load effectively, and numeral 23 denotes an output controller for controlling the switching of the power source 28 to thereby control the output of the generator 22, and, thereby, the output of the lamp 2. The output controller 23 includes an instructing unit 24 and a contact 25 of the unit 24. The power source 21 has a double voltage rectifier 27 which has a high voltage transformer 26, a diode, and a capacitor.

The electrodeless discharge discharges a tube by applying an electromagnetic field of high frequency (microwave) to the discharge tube sealed with rare gas or mercury to excite the discharge tube, thereby discharging the tube without electrodes to irradiate light. This illuminator is disclosed in U.S. Pat. No. 3,911,318, Japanese Unexamined Patent Publication No. 50-79975, and Japanese Unexamined Patent Publication No. 52-116155, and a suitable lamp may be disposed in the microwave generator to irradiate the light, and the detailed description will be omitted.

In FIG. 10, the power source 21 supplies a high d.c. voltage for exciting a magnetron used in the microwave generator 22, and the output controller 23 has a switch for controlling the generation of the d.c. voltage.

More specifically, a high d.c. voltage is supplied to the magnetron for a predetermined period under the control of the output controller 23, thereby generating a microwave to allow the lamp 2 to irradiate light. Therefore, the light is irradiated from the lamps 2 to the plants 3 in FIG. 1. Here, since the lamps 2 are excited by microwave, it takes less time to provide the same luminous flux as the ordinary HID lamp (the time is normally several minutes in the prior electrode discharge tube). In the HID lamp, it is not reexcited in a short time (within several minutes), if once extinguished, but in the electrodeless discharge by the microwave, no particular difficulty occurs in the reexciting of the electrodeless discharge lamp.

Figure 11:
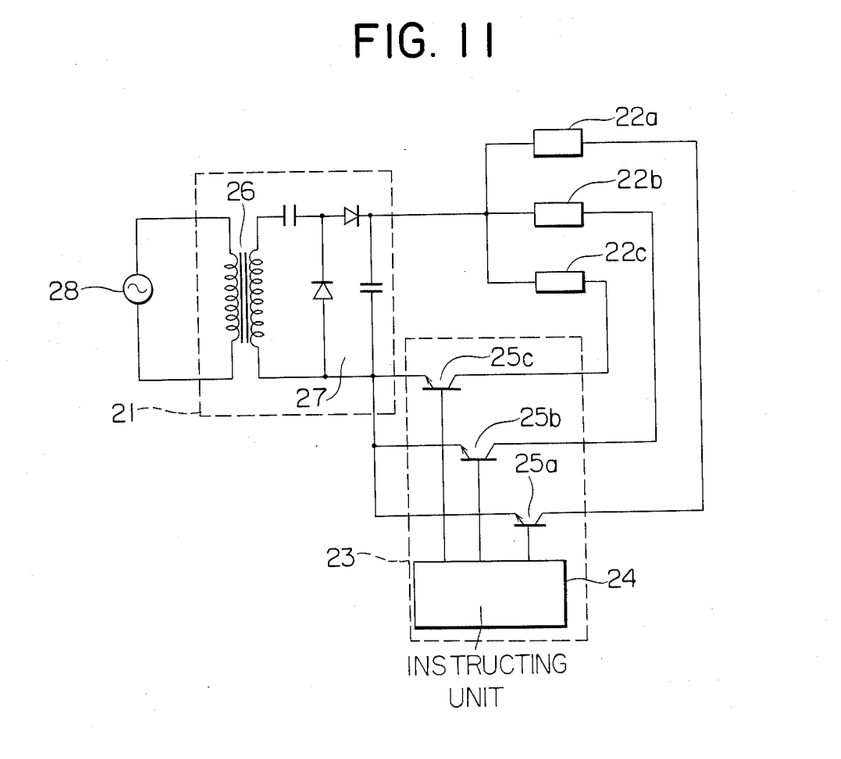
FIG. 11 is a circuit diagram showing another embodiment of FIG. 10.

When the illuminator of the embodiment shown in FIG. 5 is operated by using an electrodeless discharge lamp, the illuminator is constructed as shown in FIG. 11. Changeover switches 25a, 25b, 25c, which employ semiconductor switching elements, are controlled by signals fed from an instructing unit 24 of the output controller 23 sequentially from the power source 21 to microwave generators 22a, 22b, 22c to supply the voltage. Then, the lamps are excited by the operation of the microwave generator.

In the embodiments in FIGS. 10 and 11, the lamps for performing electrodeless discharge can readily select an element to be sealed therein, as compared with the ordinary HID lamp, and has the advantage of obtaining a desired emitting light.

The construction of the power source 21 may be not only a combination of a high voltage transformer and a double voltage rectifier, but a d.c.-d.c. converter for obtaining a desired high d.c. voltage. The output controller may have a timer for generating a signal having a predetermined period and means for controlling the output of the power source 21, such as, for example, switching means of the primary side of the high voltage transformer.

When the power source has a d.c.-d.c. converter, the output of the power source may be varied (controlled) by altering the control state of the converter.

Further, the illuminator of the above embodiments may be combined with a unit for extinguishing the lamps and keeping the lamps extinguished by providing a long "dark" period corresponding to night.

Figure 4:
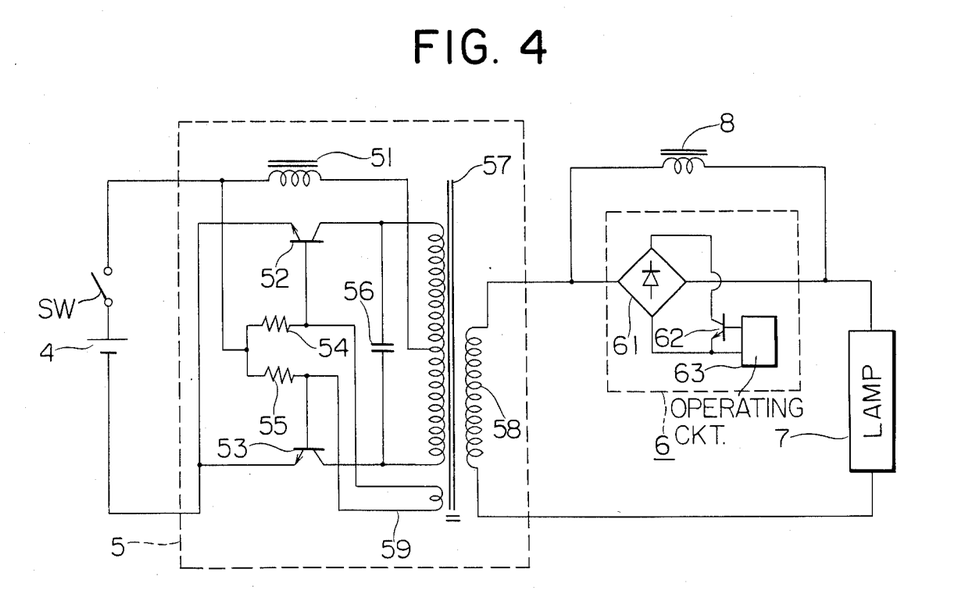
FIG. 4 is a circuit diagram showing another embodiment of the present invention.

The lamps in FIGS. 1 and 4 may fail to be excited at the end of the lifetime, and their failure is difficult to predict. As a result, there is a possibility of the plants being affected due to the failure in the excitation of the lamps. More specifically, if the lamps approach the end of their lifetime, they gradually become difficult to excite for discharging, and eventually fail to be excited if it is attempted to periodically vary the outputs of the lamps. Therefore, there is a possibility of causing a large defect in breeding the plants during the time that the lamps are exchanged.

Figure 12:
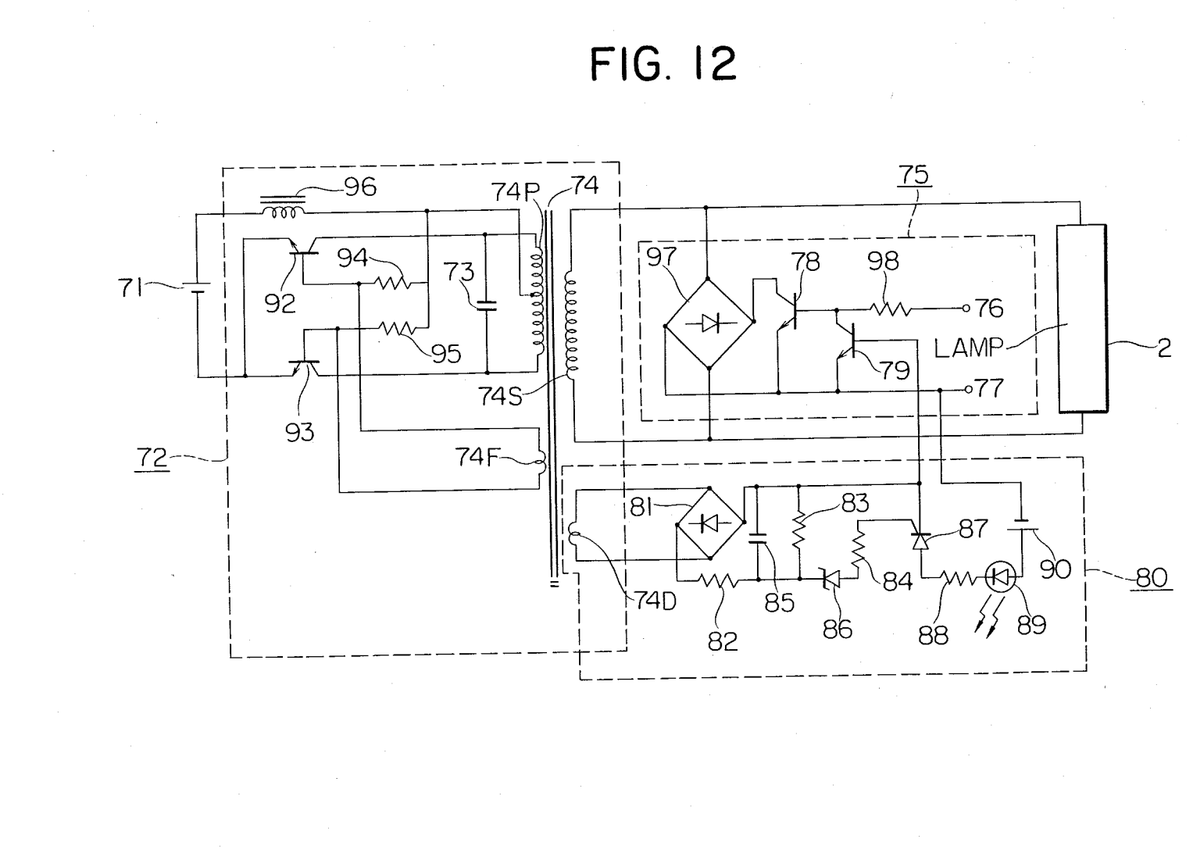
FIG. 12 is a circuit diagram showing an embodiment of the present invention employing means for detecting asymmetrical discharge of a lamp.

However, the excitation failure of lamps can be predicted by asymmetrically discharging after lamps approach their lifetime, and then the excitation failure of the lamps is prevented by detecting the asymmetrical discharge by detecting means, stopping the periodic change of the output of the lamps in response to the detection of the asymmetrical discharge and facilitating the continuity of the discharge. FIG. 12 shows the embodiment for performing this concept.

In FIG. 12, numeral 71 denotes a d.c. power source, numeral 72 denotes an inverter, numeral 73 denotes a resonance capacitor, and numeral 74 denotes an output transformer, which is composed of a leakage transformer. Numeral 75 denotes an output controller connected in parallel with the lamp 2 for controlling the output of the lamp 2 by turning a transistor 78 ON and OFF by a signal applied to terminals 76, 77. When a transistor 79 is turned ON, transistor 78 is OFF, and, as a result, the output of the lamp 2 is not controlled but the lamp 2 is continuously excited. As required in fluorescent lamps, a preheating electrode, which is not shown, is applied to lamp 2.

Numeral 80 denotes an asymmetrial discharge detector with a detecting winding 74D. The detecting winding 74D is in the magnetic circuit of the secondary winding 74S of the transformer 74, a full-wave rectifier 81, resistors 82, 83, 84, a capacitor 85, a constant-voltage diode 86, a thyristor 87, a resistor 88, a display light emitting diode 89, and a control power source 90. The power source 90 is formed of suitable means for dividing the voltage of the power source 71. Numerals 92, 93 denote transistors, 94, 95 denote resistors, 96 denotes a reactor, numeral 74P denotes a primary winding, numeral 74F denotes a feedback winding, numeral 97 denotes a full-wave rectifier, and numeral 98 denotes a resistor.

In the arrangement of the illuminator in FIG. 12, a discharging current flows through the discharge lamp 2 due to the a.c. voltage of the a.c. power source. The discharging current is substantially equal in both positive and negative half cycles. However, the lamp 2 will be damaged at the electrodes due to the excitation and will eventually stop discharging. Since the damage to each electrode is unique, discharging becomes asymmetrical before the lamps stop discharging. In this state, the lamp voltage becomes high only in one half cycle, and the discharging current becomes asymmetrical. This asymmetrical discharging state might happen in a normal lamp immediately after discharging is started, but returns to the normal discharge state in a very short period of time. On the other hand, when the lamp is close to the end of life, the asymmetrical discharge continues for a long period.

In the embodiment described above, the end of the life of the lamp 2 is predicted by detecting the asymmetrical discharge described above, and the operation of varying the output of the lamp 2 is continued to prevent the lamp 2 from failing in the excitation state.

Figure 13:
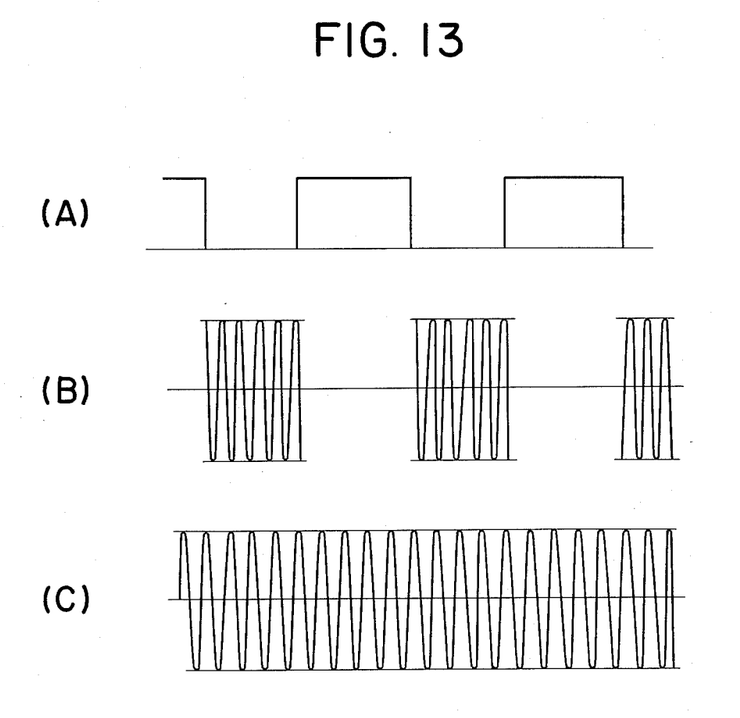
FIG. 13 is an explanatory view of the operation of the embodiment of FIG. 12.

On the other hand, the inverter 72 self-oscillates, as known in the prior art, and the lamp 2 is excited. In the output controller 75, when a signal having a predetermined period and time, as shown in FIG. 13(A), is applied to terminals 76, 77, the transistor 78 is turned ON and OFF in response to this, and a current flows to the lamp 2, as shown in FIG. 13(B).

Now, assume that the lamp 2 is discharging asymmetrically due to the fact that it is close to the end of its life. Since the output voltage of the detecting winding 74D is similar to the voltage of the lamp 2, the voltage across lamp 2 becomes high during the half cycle that the discharge is difficult, and the voltage is applied to an integrator having a resistor 82, a capacitor 85, and a constant-voltage diode 86. When the asymmetrical discharge continues, the voltage of the capacitor 85 becomes sufficiently high, and a thyristor 87 is triggered by the diode 86 and turned ON. Thus, a transistor 79 is continuously turned ON, a transistor 78 is continuously turned OFF, and a current, as shown in FIG. 13(C) continuously flows through the lamp 2. Thus, failure of the excitation of lamp 2 is prevented. The stop of the output control of the lamp 2 is indicated by emitting a light from a light emitting diode 89. In the embodiment described above, the output controller 75 is provided in parallel with the lamp 2. However, the output of the lamp 2 may be controlled by other means. Also, the detecting winding 74D is provided in the output transformer 74 as the detecting means of the assymmetrical discharge, and the variation in the output voltage is utilized. However, other means, such as variation in the lamp voltage or current, may be used as a detection signal.

Figure 14:
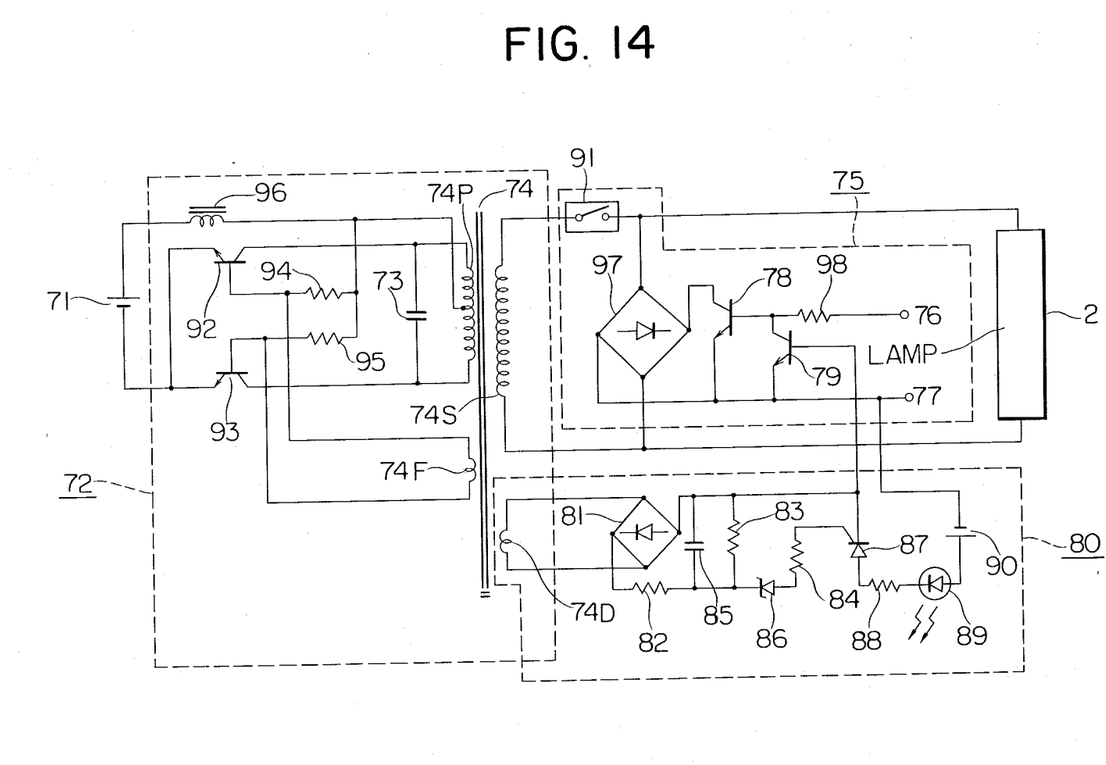
FIG. 14 is a circuit diagram showing another embodiment of FIG. 12.

FIG. 14 shows another embodiment of the invention in which an impedance for limiting the discharge current of the lamp 2 is effective, particularly when the impedance is inductive reactance. More specifically, numeral 91 denotes a thermal protector of a resetting type for interrupting the current by means of the output transformer 74 and the operation due to the temperature rise of other components.

When the lamp is in an asymmetrical discharge state, the transistor 78 is turned OFF, the output controller 7 is turned OFF, and a continuous current flows through the lamp 2. However, when the asymmetrical discharging current flows through the lamp 2, the impedance (which is the leakage transformer of the output transformer 74) for limiting the lamp current is a reactance component. Thus, the discharging current which includes a d.c. component increases when temperature rises. In this case, it is interrupted by the operation of the thermal protector 91. It is naturally reset to the original state after reducing to the predetermined temperature. Even if the current of the lamp 2 is interrupted by the thermal protector 91, the thyristor 87 continues the ON state. However, when the control power source 90 obtains, by rectifying the output of a winding provided at the primary side of the output transformer 74 when the inserting position of the thermal protector 91 is, for example, disposed at the position for opening or closing the d.c. power source 71, the thyristor 87 is turned OFF after the thermal protector 91 is reset. Therefore, when the lamp 2 is returned to the normal discharge, the lamp discharges normally. Since the opening and closing operations of the thermal protector 91 are very slow, as compared with the operating period of the output controller 75, before the lamp approaches its lifetime, the possibility of excitation failure is practically zero. Further, the embodiment may employ a unit for exciting two or more lamps if the unit can excite the lamps in high frequency and the outputs of the lamps are periodicaly varied by the output controllers 75.

In the embodiments shown in FIGS. 12 and 14 described above, the asymmetrical discharge of the discharge lamp is detected and the excitation failure of the discharge lamp is predicted and prevented. Therefore, when the illuminator of the invention is applied to the cultivation of plants, excitation failure of the lamps for a long period can be prevented, thereby preventing a defect during breeding of the plants.

What is claimed is:

1. An illuminator to provide light for cultivating a plant comprising:
   high frequency power source means having an output and an input connected via a converter to a d.c. power source,
   discharge lamp means excited by the output of said high frequency power source means to supply light for cultivating the plant, and
   bright and dark controller means for controlling the output of said high frequency power source means to alternatively supply high power and low power to said discharge lamp means,
   said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp, $t_0$ is the period of the low power, $F_0$ is the rated power of said discharge lamp means, and $F_1$ is the high supply power.

2. An illuminator to provide light for cultivating a plant comprising:
   high frequency power source means having an output and an input connected via a converter to a d.c. power source,
   discharge lamp means excited by the output of said high frequency power source means to supply light for cultivating the plant,
   bright and dark controller means for controlling the output of said high frequency power source means to alternatively supply high power and low power to said discharge lamp means,
   said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp and is set at a desired value, $t_0$ is the period of the low power, $F_0$ is the rated power of said discharge lamp means, $F_1$ is the high supply power, and a sum T of the high power period $t_1$ and the low power period $t_0$ and the output $F_1$ are varied in accordance with the set desired value of $t_1$.

3. An illuminator as claimed in claim 1 wherein said discharge lamp means includes a plurality of discharge lamps arranged to irradiate from above and below the plant and controlled by said controller means to provide different intensities and periods of illumination to permit adjustment of bright and dark periods.

4. An illuminator as claimed in claim 1 wherein the d.c. power source is a rectified a.c. power source.

5. An illuminator as claimed in claim 1 further including asymmetrical discharge detection means for detecting when said discharge lamp means becomes an asymmetrical discharge state so as to provide a constant output power for said discharge lamp means.

6. An illuminator as claimed in claim 5 further including display means for indicating externally the asymmetrical discharge state detected by said asymmetrical discharge detection means.

7. An illuminator as claimed in claim 5 wherein said bright and dark controller means comprises a reset-type thermal protector operable responsive to temperature rise occurring upon an increase in discharge current.

8. A method for cultivating a plant comprising:
   irradiating a plant with light in alternating controlled bright and dark periods using a discharge lamp means supplied by alternating high and low power from a high frequency power source means and satisfying the conditions of $F_1/F_0 \geq 2$, $t_1 > 100$ microseconds, $t_0 + t_1 < 20$ milliseconds, where $t_1$ is the period of the high power to be supplied to said discharge lamp means, $t_0$ is the period of the low power, $F_0$ is the rated power of said discharge lamp means, and $F_1$ is the high supply power.

9. A method for cultivating a plant according to claim 8 wherein the low supply power is zero or substantially zero to flow a small amount of current through the discharge lamp during dark periods to maintain discharge lamp means discharge during the dark periods.

10. An illuminator to provide light for cultivating a plant comprising:
    high frequency power source means provided by a plurality of high frequency power sources and having an output and an input connected via a converter to a d.c. power source,
    discharge lamp means excited by the output of said high frequency power source means to supply light for cultivating the plant,
    bright and dark controller means including a plurality of bright and dark controllers for controlling the output of said high frequency power source means to alternatively supply high power and low power to said discharge lamp means, said bright and dark controllers being synchronized with each other so that periods of high power thereof are not superposed on one another,
    said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp and is set at a desired value, $t_0$ is the period of the low power, $F_0$ is the rated power of said discharge lamp means, and $F_1$ is the high supply power.

11. An illuminator to provide light for cultivating a plant comprising:
    high frequency power source means provided by a plurality of high frequency power sources and having an output and an input connected via a converter to a d.c. power source,
    discharge lamp means including a plurality of discharge lamps excited by the output of said high frequency power source means to supply light for cultivating the plant,
    bright and dark controller means including a plurality of bright and dark controllers for controlling the output of said high frequency power source means to alternatively supply high power and low power to said discharge lamp means at displaced periods relative thereto,
    said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp and is set at a desired value, $t_0$ is the period of the low power, $F_0$ is the rated power of said discharge lamp means, and $F_1$ is the high supply power.

12. An illuminator to provide light for cultivating a plant comprising:
    high frequency power source means having an output and an input connected via a converter to a d.c. power source,
    discharge lamp means including a plurality of discharge lamps having different light emitting spectra and excited by the output of said high frequency power source means to supply light for cultivating the plant,
    bright and dark controller means for controlling the output of said high frequency power source means to alternatively supply high power and low power to said discharge lamp means,
    said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp and is set at a desired value, $t_0$ is the period of the low power, $F_0$ is the rated power of said discharge lamp means, and $F_1$ is the high supply power.

13. An illuminator to provide light for cultivating a plant comprising:

high frequency power source means having an output and an input connected via a converter to a solar-charged battery, discharge lamp means excited by the output of said high frequency power source means to supply light for cultivating the plant, bright and dark controller means for controlling the output of said high frequency power source means to alternatively supply high power and low power to said discharge lamp means, said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp and is set at a desired value, $t_0$ is the period of the low power, $F_0$ is the rated power of said discharge lamp means, and $F_1$ is the high supply power.

14. An illuminator to provide light for cultivating a plant comprising:

high frequency power source means having an output and an input connected via a converter to a d.c. power source including a solar-charged battery for use in daytime and a rectified a.c. power source for use at night or low solar conditions, discharge lamp means excited by the output of said high frequency power source means to supply light for cultivating the plant, bright and dark controller means for controlling the output of said high frequency power source means to alternatively supply high power and low power to said discharge lamp means, said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp and is set at a desired value, $t_0$ is the period of the low power, $F_0$ is the rated power of said discharge lamp means, and $F_1$ is the high supply power.

15. An illuminator to provide light for cultivating a plant comprising:

high frequency power source means provided by a microwave generator and having an output and an input connected via a converter to a d.c. power source, discharge lamp means excited by the output of said high frequency power source means to supply light for cultivating the plant, bright and dark controller means for controlling the output of said high frequency power source means to alternatively supply high power and low power to said discharge lamp means, said controller means controlling to satisfy the conditions of $F_1/F_0 \geq 2$, $t_1 > 100$ microseconds, $t_0 + t_1 < 20$ milliseconds, where $t_1$ is the period of the high power to be supplied to said discharge lamp and is set at a desired value, $t_0$ is the period of the low power, $F_0$ is the rated power of said discharge lamp means, $F_1$ is the high supply power.

* * * * *

UNITED STATES PATENT AND TRADEMARK OFFICE
CERTIFICATE OF CORRECTION

PATENT NO. : 4,749,916
DATED : June 7, 1988
INVENTOR(S) : YAMAZAKI ET AL

It is certified that error appears in the above-identified patent and that said Letters Patent is hereby corrected as shown below:

In the Title, change "Plant" to ---Plants---.

Signed and Sealed this

First Day of November, 1988

Attest:

DONALD J. QUIGG

*Attesting Officer*   *Commissioner of Patents and Trademarks*